United States Patent [19]

Niewold

[11] 4,419,037
[45] Dec. 6, 1983

[54] TRUCK AUGER-HOPPER CONSTRUCTION

[76] Inventor: Donald W. Niewold, 149 N. Market St., Paxton, Ill. 60957

[21] Appl. No.: 221,293

[22] Filed: Dec. 30, 1980

[51] Int. Cl.$^3$ ............................. B60P 1/04; B60P 1/40
[52] U.S. Cl. ..................................... 414/489; 414/523; 414/526; 222/610; 222/626; 222/163; 222/381; 222/536
[58] Field of Search ......................... 222/526, 529–530, 222/536–537, 381, 320–321, 290, 163, 610, 622, 626–627; 414/489, 504–505, 523, 526; 198/671, 558, 555

[56] References Cited

U.S. PATENT DOCUMENTS

| | | | |
|---|---|---|---|
| 922,390 | 5/1909 | Chalfant | 414/523 |
| 2,585,169 | 2/1952 | Potter | 414/526 X |
| 2,757,808 | 8/1956 | Mendez | 414/523 |
| 3,090,527 | 5/1963 | Rensch | 222/610 |
| 3,265,253 | 8/1966 | Niewold | 222/321 |
| 3,273,734 | 9/1966 | Schuler | 414/504 |
| 3,342,355 | 9/1967 | Lasiter | 414/526 X |
| 3,498,483 | 3/1970 | Meharry | 414/523 |
| 3,572,643 | 3/1971 | Birdsall | 414/526 X |
| 3,642,155 | 2/1972 | Carlson | 414/523 |

Primary Examiner—Charles A. Marmor
Attorney, Agent, or Firm—Lockwood, Dewey, Alex & Cummings

[57] ABSTRACT

An auger-hopper construction for mounting at the tailgate of a truck includes a pair of hoppers, one of which is stationarily and removably mounted to the truck, and the second of which is pivotally mounted to the first hopper adjacent an opening in the bottom of the first hopper. The second hopper also includes an opening adjacent its bottom at which an auger tube is swivelly mounted. The auger tube, by virtue of the pivotal and swivel mountings is pivotable in a 90° arc in a plane perpendicular to the axis of the pivotal movement and is swivelable in a 180° arc in a plane which is parallel to the axis of the pivotal movement.

20 Claims, 3 Drawing Figures

TRUCK AUGER-HOPPER CONSTRUCTION

BACKGROUND AND SUMMARY OF THE INVENTION

The present invention relates to an auger-hopper construction and, more particularly, to an auger-hopper construction for mounting to tha tailgate of a truck.

Auger tubes for pumping feed, fertilizer, grain and other free flowing particulate or granular materials have been mounted to the tailgates of trucks in the past for feeding the material from the truck to some discharge point, such as a grain elevator, grain drill or the like. Such prior constructions either consisted of an auger tube rigidly mounted in the truck tailgate so that it was immobile relative to the tailgate or the auger tube was swivelly mounted directly on the tailgate so that it could only be moved in two degrees of freedom relative to the tailgate, i.e., in a plane parallel to the plane of the tailgate. Because of the manner of mounting the auger tube in these prior constructions, the ability to position the discharge end of the auger tube was limited relative to the tailgate. It was either locked in relation to the tailgate or was limited to movement only in a plane parallel to the plane of the tailgate. Thus, in both of these prior auger-hopper constructions, the position of the auger discharge end was dependent upon the degree of tilt of the truck body and its tailgate and could not be readily adjusted to compensate for changes in the inclination or for different inclinations of the truck body.

In my U.S. Pat. No. 3,265,253, an auger-hopper construction is disclosed for use with a gravity flow wagon box in which the inclination of the auger tube and the position of its discharge end is capable of movement in three degrees of freedom to enable rapid and easy positioning of the discharge end of the auger tube in any one of a virtually infinite number of positions. However, the auger-hopper construction disclosed in that patent is constructed for mounting upon the discharge chute of a gravity flow wagon box. Such discharge chutes are fixed with respect to their inclination relative to the ground, unlike the tiltable body of a dump truck. Thus, the auger-hopper construction disclosed in that Letters Patent is not readily adaptable to a truck tailgate because the tiltable truck body may assume any one of a number of different inclinations during the course of unloading of the truck, unlike the fixed gravity flow wagon box discharge chute. Such variability of inclination presents configuration, clearance and spillage problems which do not exist with the stationary discharge chute of a gravity flow wagon box.

In the preferred embodiment of auger-hopper construction of the present invention, a construction is provided for mounting upon the rear or at the tailgate of an inclinable body dump truck and which is capable of easy and unrestricted three dimensional positioning of its auger tube through a wide range of limits, even though the truck body itself may additionally assume a wide range of inclinations. An advantage of the preferred embodiment of the auger-hopper construction of the present invention, is that the auger tube may be pivotally moved relative to the truck tailgate through a range of positions ranging from vertical to horizontal in a plane perpendicular to the truck tailgate, and also swivelly to the right and left in a plane parallel to the plane of the truck tailgate. Such pivotal and swiveling movements may be easily and quickly accomplished over the entire range of inclinations of the truck body. Another advantage of the preferred embodiment of the present invention is that the auger-hopper construction may be readily attached to or detached from the truck tailgate and, in certain instances, it need not even be completely detached from the truck during use of the truck for other purposes. Still another advantage of the preferred embodiment of the present invention is that the auger tube may be easily and quickly folded and stored for public highway transit and/or for garaging of the truck in a low clearance building. Yet another advantage of the auger-hopper construction of the preferred embodiment of the present invention is that it is automatically self emptying by gravity, thus insuring that few if any materials are left in the auger-hopper construction at the completion of use. In the preferred embodiment of auger-hopper construction of the present invention, the components of the construction are so arranged that feeding of the materials from the truck to the auger tube is improved and assisted by gravity.

These and other objects, features and advantages of the present invention will be more clearly understood through a consideration of the following detailed description.

BRIEF DESCRIPTION OF THE DRAWING

In the course of this description, reference will frequently be made to the attached drawing in which.

DESCRIPTION OF THE PREFERRED EMBODIMENT

Figure 1:
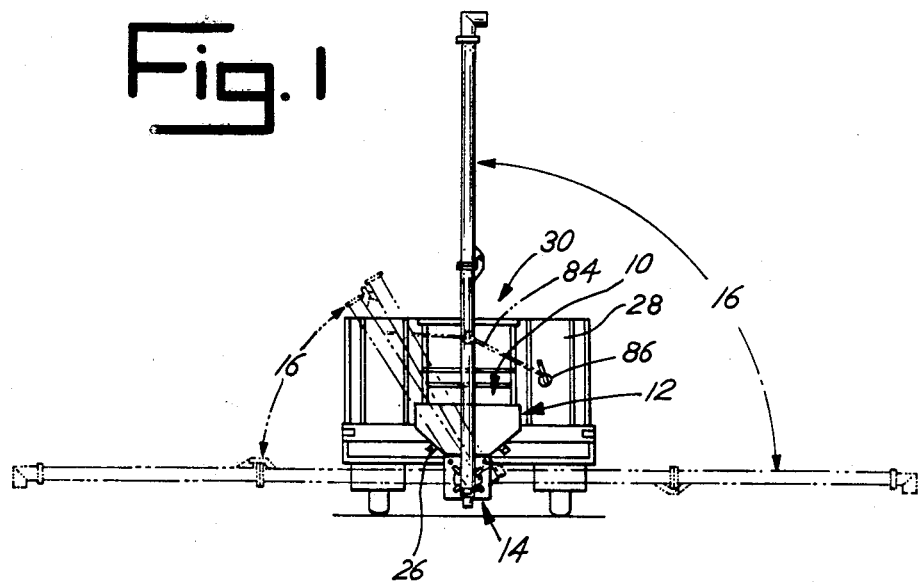
FIG. 1 is a rear elevational view of a truck and its tailgate upon which a preferred embodiment of auger-hopper construction in accordance with the principles of the present invention has been mounted.

In the attached drawings a preferred embodiment of auger-hopper construction of the invention is shown generally by reference numeral 10. The construction includes three principal components: a first hopper 12, a second hopper 14 and an auger tube 16.

Figure 2:
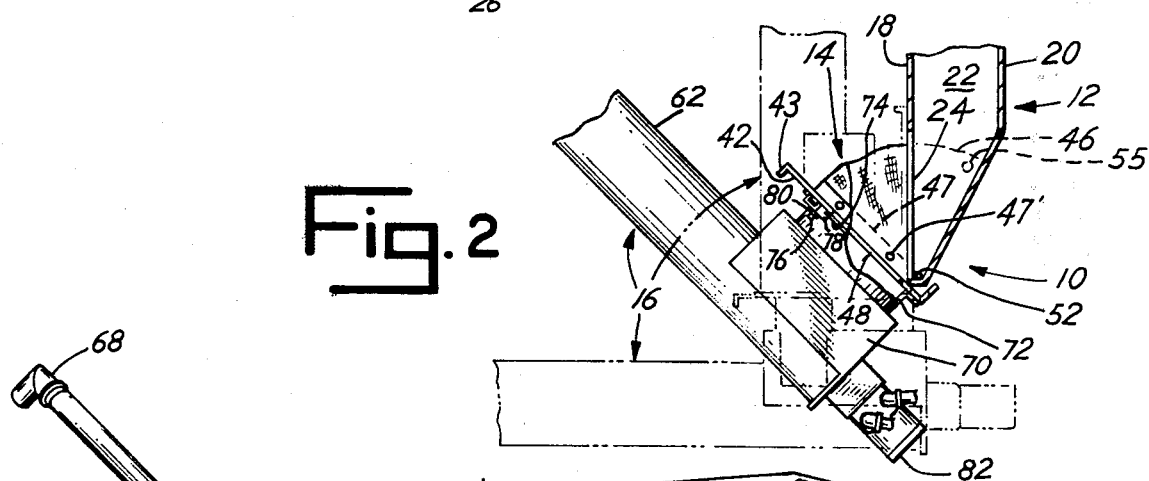
FIG. 2 is a partially broken cross sectioned side elevation view of the preferred embodiment of auger-hopper construction of the present invention.
Figure 3:
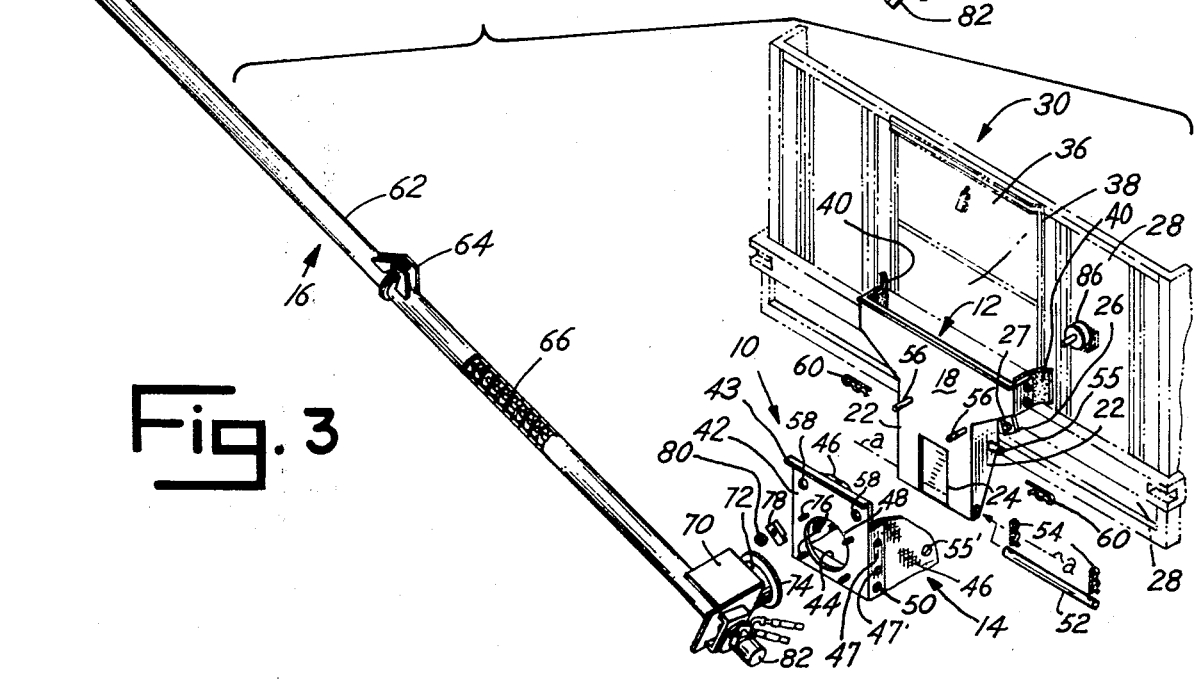
FIG. 3 is a partially broken exploded perspective view of the tailgate of the truck and the preferred embodiment of auger-hopper construction of the present invention.

The first hopper 12 preferably comprises front and rear walls 18 and 20, respectively, as shown in FIGS. 2 and 3, and a pair of spaced sidewalls 22 so as to form an enclosure. One or more of these walls are preferably inclined toward an opening 24 at the bottom of the wall 18 to direct material which enters the hopper toward the opening 24. As shown in FIGS. 2 and 3, the rear wall 20 and the sidewalls 22 are both so inclined over at least portions of their height.

Mounting means, generally 26 as shown in FIG. 3, are provided for mounting the hopper 12 either to the truck tailgate 28 or the frame of the truck, generally 30, in stationary fixed relationship to the tailgate or frame. As shown in FIG. 3, the mounting means 26 may comprise L-shaped angle members which are welded or otherwise attached to the hopper sidewalls 22 and which are bolted by bolts 27 to the truck frame so that the hopper 12 may be easily removed from the truck when it is not needed. Although only one mounting means 26 is shown in FIG. 3, it will be understood that another is positioned on the other side of hopper 12 which is blocked from view in FIG. 3. It will also be understood that the truck mounting shown in one of a number of suitable mountings for the auger-hopper construction of the present invention and that one skilled in the art may widely select from a variety of suitable mountings upon consideration of the principles of the invention.

Typical of trucks employed in the agricultural field, the tailgate 28 of the truck may include a vertically slidable door 36 as shown in FIG. 3 which may be preferentially adjusted to vary the area of the opening 38 in the tailgate for discharge of the material from the truck body to hopper 12. A pair of preferably flexible deflectors 40 may also be bolted or otherwise fixed to the top sidewalls 22 of hopper 12 to guide the material passing from opening 38 and the tailgate 28 into the hopper to prevent spillage.

The second hopper 14 comprises a front wall 42 having a flange 43 at its top, a partial bottom wall or flange 44 to prevent spillage during operation, and a pair of flexible sidewalls 46 which also together define an enclosure. The front wall 42 includes a pair of flanges 47 at its sides which extend toward hopper 12 and an opening 48 adjacent its bottom. The flexible sidewalls 46 are preferably formed by canvas or belting to allow them to buckle when the front wall 42 is moved into parallel relationship with the front wall 18 of hopper 12. The sidewalls are mounted to the respective flanges 47 by suitable means, such as bolts 47'. Openings 50 adjacent the bottom of the flanges 47 are positioned to receive a pivot rod 52 which extends transversely through the openings and the bottom of hopper 12 as shown in FIG. 3 to provide a pivot construction for pivoting the front wall 42 of hopper 14 about a horizontal axis a between limit positions in which the wall 42 and wall 18 of hopper 12 are parallel to each other or are perpendicular to each other. Positioning of the openings 50 adjacent the bottom of flanges 47 on the second hopper 14 insures that at no time does the lowest portion of the second hopper project substantially beneath the first hopper, as can be seen in FIG. 2. Cotter pins 54 or other suitable fixing means may be provided through the ends of rod 52 to prevent inadvertent removal of the rod and hopper 14 during operation. However, the cotter pins 54 may be quickly and easily removed to allow rapid removal of hopper 14 from hopper 12, if desired.

The ends of the flexible sidewalls 46 opposite flanges 47 are preferably attached by removable means to the hopper 12. For example, a stud 55 may be welded to the sidewalls 22 of hopper 12 which is inserted in a hole 55' in the flexible sidewalls 46 as shown in FIG. 3. Again, a cotter pin (not shown) may be inserted through the end of the stud 55 to allow ready removal of the sidewalls from the studs when it is desired to detach hopper 14 from hopper 12.

Studs 56 are also fixed, such as by welding, to wall 18 of hopper 12 and extend in alignment with complementary openings 58 in wall 42 of hopper 14. Again, suitable cotter pins 60 may be provided with studs 56 to lock the front wall 42 of hopper 14 in place in the vertical, such as when the auger tube 16 is folded in the transport position as shown in dot and dash in FIG. 1.

The auger tube 16 comprises an elongate cylinder 62 which may be of either one piece construction or of two or more pieces which are hinged at 64 for folding and storage as shown in FIG. 1. A suitable auger 66 is positioned in the cylinder 62 for moving materials from the bottom end of the cylinder toward its discharge end or head 68.

An elbow or receiving box 70 is positioned at the bottom end of the auger cylinder 62 and preferably includes a sleeve 72 having a circular flange 74 at its outer end. The flange 74 is adapted to be positioned flush against the front face of wall 42 of hopper 14 and such that its perimeter lies within the confines of a plurality of studs 76 which are fixed by suitable means, such as welding, to the front wall 42 of hopper 14. A plurality of lugs 78 are attached by nuts 80 to studs 76 in overlying relationship to flange 74 to hold the flange against front wall 42 of hopper 14, but allow the flange to swively rotate therebeneath to allow for a swiveling motion of the auger tube 16 in a plane parallel to front wall 42 of hopper 14 and to the axis a of the pivotal movement of hopper 14.

A suitable motor 82, which may be hydraulically driven from the truck, is also mounted in the bottom end of the auger tube 16 to drive the auger 66.

The discharge head 68 is also preferably mounted for swiveling motion at the top of the auger cylinder 62 to allow the discharge of material to be directed in a specific direction relative to the auger cylinder 16.

The hopper 12 is of minimum height to prevent it and the hopper 14 and auger elbow 70 from striking either the ground or the chassis of the truck 30 at maximum inclination of the dump body and/or auger tube. The provision of the flexible sidewalls 46 of hopper 14 also assists in this respect, because they buckle as the auger tube 16 is elevated to its maximum vertical elevation and, thus, do not extend inwardly past the wall 20 of hopper 12 where they might otherwise contact the truck bed 28 when the auger tube 16 is at its maximum elevation.

The flanges 43 and 47 and the bottom flange 44, in addition to the other functions previously described for them, also serve to strengthen the wall 42 of hopper 14 so that it is capable of easily bearing the weight of the auger tube 16.

From the above description it will be seen that the auger tube 16 is capable of independent movement relative to the tailgate 28 of the truck to assume a virtually infinite number of different inclinations and may easily be adjusted in three degrees of freedom if desired whenever the inclination of the truck body is changed. As shown in FIG. 2, the auger tube 16 may be moved between any one of a number of arcuate positions between vertically upward as shown in dot and dash to horizontally rearward in a plane perpendicular to the pivotal axis a by the pivotal movement of hopper 14 about pivot rod 52. The auger tube 16 may also be simultaneously moved between any one of a plurality of positions between vertically upward as shown in solid in FIG. 1 or to the full horizontal right or left as shown in dot and dash in FIG. 1 over virtually a 180° arc in a plane parallel to the pivotal axis a by the swiveling of flange 74 relative to the front wall 42 of hopper 14. The auger tube 16 may also be folded for storage or transit as shown in dot and dash in FIG. 1. These latter movements are allowed by the swiveling motion at flange 72.

A positioning chain or cable 84 may be provided as shown in FIG. 1 coupled to the auger tube 16 and a hand cranked or other form of winch 86 attached to the tailgate 28 of the truck for adjusting the inclination of the auger tube 16 and maintaining it in its desired inclination.

It will be seen that by virtue of the truck mounting 26 that the entire auger-hopper construction of the present invention may be readily attached to or detached from the truck for use of the truck in operations not requiring the auger tube or vice versa. Moreover, by provision of the removable rod 52 and its cotter pins 54 and stud 55, it is not necessary to remove the entire auger-hopper construction when it is desired to use the truck for purposes not requiring the auger. The hopper 14 and auger tube 16 need only simply be removed and hopper 12 left on the truck tailgate to use the truck for normal dumping operations of granular materials. When the auger tube 16 and hopper 14 are removed, the materials will merely enter hopper 12 from opening 38 and be discharged from the hopper opening 24 when the truck body is inclined.

Attention is also directed to the positioning of openings 24 and 48 in walls 18 and 42 respectively of hoppers 12 and 14. Both openings 24 and 48 are preferably positioned adjacent the bottom of these walls and such that they are aligned with each other when wall 42 is moved to the vertical against wall 18. Such positioning and alignment not only insures that hoppers 12 and 14 are self-emptying by gravity when the load in the truck has been fully discharged, but also insures improved and optimum feeding by gravity of the granular materials in the truck during operation of the auger-hopper construction of the invention because the materials passing from opening 24 are forced by the weight of the materials both in the truck and the hopper 12 and the materials pass directly from opening 24 to the opening 48 in a path of minimum length and least resistance.

It will be understood that the embodiment of the present invention which has been described is merely illustrative of an application of the principles of the invention. Numerous modifications may be made by those skilled in the art without departing from the true spirit and scope of the invention.

What is claimed is:

1. An auger-hopper construction for mounting to an inclinable body of a truck to receive material from the truck comprising:
    first hopper means, said first hopper means having an opening adjacent the bottom thereof,
    first hopper mounting means for mounting said first hopper means to the truck body to incline with the truck body when the body is inclined and in a position to receive the material from the truck body in various positions of inclination of the body,
    second hopper means having an opening therein,
    pivotal mounting means for pivotally mounting said second hopper means to said first hopper means to receive material from said opening in said first hopper means, said pivotal mounting means permitting said second hopper means to pivot about an axis between upper and lower pivot limits, and wherein the lowest portion of said second hopper means does not project substantially beneath said first hopper means when said second hopper means is pivoted about said axis to extend horizontally,
    auger tube means,
    swivel mounting means mounting one end of said auger tube means to said second hopper means and overlying the opening therein to receive material from said latter opening,
    said pivotal mounting means and swivel mounting means cooperating to simultaneously permit inclination of said auger tube means in a plane substantially perpendicular to the axis of the pivotal movement and also in a plane substantially parallel to the axis of the pivotal movement and at substantially all angles of inclination of the truck body when said first hopper means is mounted to the truck body.

2. The auger-hopper construction of claim 1 wherein said first hopper mounting means mounts said first hopper means in stationary, but removable relationship to the truck.

3. The auger-hopper construction of claim 1 wherein said first hopper means includes walls which are inclined toward its opening to channel material in said first hopper means toward its said opening.

4. The auger-hopper construction of claim 1 wherein said first hopper means includes a substantially vertical wall.

5. The auger-hopper construction of claim 4 wherein said second hopper also includes a wall and locking means to lock said walls of said first and second hopper means in substantially parallel relationship to each other.

6. The auger-hopper construction of claim 5 wherein said locking means comprise stud means on said wall of one of said first and second hopper means and a complementary opening to receive said stud means on said wall of the other one of said first and second hopper means.

7. The auger-hopper construction of claim 1 wherein said pivotal mounting means removably mounts said second hopper means to said first hopper means.

8. The auger-hopper construction of claim 7 wherein said second hopper means includes side members extending from it toward said first hopper means, and said pivotal mounting means comprises an opening in said side members and rod means extending through said opening and said first hopper means.

9. The auger-hopper construction of claim 1 wherein said second hopper means includes flexible sidewalls.

10. The auger-hopper construction of claim 1 including support means for supporting said auger tube means in each of said inclinations.

11. The auger-hopper construction of claim 1 wherein said opening in said second hopper means is located adjacent the bottom of said second hopper means.

12. The auger-hopper construction of claim 11 wherein said openings of said first and second hopper means are in substantial alignment with each other when said second hopper means is substantially vertical.

13. The auger-hopper construction of claim 1 wherein said pivotal and swivel mounting means permit inclination of said auger tube means in an arc of at least approximately 90° in said plane substantially perpendicular to the axis of the pivotal movement and in an arc of at least approximately 180° in said plane substantially parallel to the axis of the pivotal movement.

14. The auger hopper construction of claim 13 wherein said first hopper mounting means mounts said first hopper means in stationary, but removable relationship to the truck, said first hopper means includes walls which are inclined toward its opening to channel material in said first hopper means toward its said opening, said first hopper means includes a substantially vertical wall, locking means to lock said first and second hopper means to each other when said second hopper means is in said vertical position, and said pivotal mounting means removably mounting said second hopper means to said first hopper means.

15. The auger-hopper construction of claim 14 wherein said locking means comprise stud means on said vertical wall of said first hopper means and a complementary opening to receive said stud means on said second hopper means.

16. The auger-hopper construction of claim 14 wherein said second hopper means includes side members extending from it toward said first hopper means, and said pivotal mounting means comprises an opening in said side members and rod means extending through said opening and said first hopper means.

17. The auger-hopper construction of claim 14 wherein said second hopper means includes flexible sidewalls.

18. The auger-hopper construction of claim 14 wherein said openings of said first and second hopper means are in substantial alignment with each other when said second hopper means is substantially vertical.

19. The auger-hopper construction of claim 1 including, in combination therewith, said inclinable truck body, said truck body including a tailgate having an opening therein to discharge the materials from said truck body, and said first hopper mounting means mounts said first hopper means adjacent said tailgate to receive the materials discharged from said tailgate opening.

20. The auger-hopper construction of claim 1, wherein when said second hopper means is pivoted about said axis between said upper and lower pivot limits it extends substantially vertically and horizontally, respectively, when the truck body is not inclined.

* * * * *

UNITED STATES PATENT AND TRADEMARK OFFICE
CERTIFICATE OF CORRECTION

PATENT NO. : 4,419,037
DATED : December 6, 1983
INVENTOR(S) : Donald W. Niewold

It is certified that error appears in the above-identified patent and that said Letters Patent are hereby corrected as shown below:

Column 1, line 8 - delete "to tha" and insert --at the--.

Column 3, line 2 - delete "in" and insert --is--.

Column 3, line 25 - delete "by" and insert --of--.

Column 3, line 53 - before the words "stud 55" delete the word "the".

Signed and Sealed this

Seventeenth Day of April 1984

[SEAL]

*Attest:*

GERALD J. MOSSINGHOFF

*Attesting Officer*     *Commissioner of Patents and Trademarks*